Nov. 25, 1924.

F. B. REILLY

POULTRY FEEDER

Filed July 23, 1923

1,516,752

Witness
Lynn Latta

Inventor
Frank B. Reilly
By Bair & Freeman
Attys

Patented Nov. 25, 1924.

1,516,752

UNITED STATES PATENT OFFICE.

FRANK B. REILLY, OF DES MOINES, IOWA.

POULTRY FEEDER.

Application filed July 23, 1923. Serial No. 653,173.

*To all whom it may concern:*

Be it known that I, FRANK B. REILLY, a citizen of the United States, and a resident of Des Moines, in the county of Polk and State of Iowa, have invented a certain new and useful Poultry Feeder, of which the following is a specification.

The object of my invention is to provide a poultry feeder of simple, durable and comparatively inexpensive construction.

More particularly, my invention relates to a poultry feeder wherein mash feed is used, the parts being so arranged that the feed will be agitated somewhat assuring the proper delivery thereof from the hopper to the openings in the hopper so that the poultry may gain access to the feed.

Still a further object is to provide a pair of foot rests on each side of the hopper which are connected together by members extending therethrough so that movement will cause the members within the hopper to move for agitating the feed therein.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1:
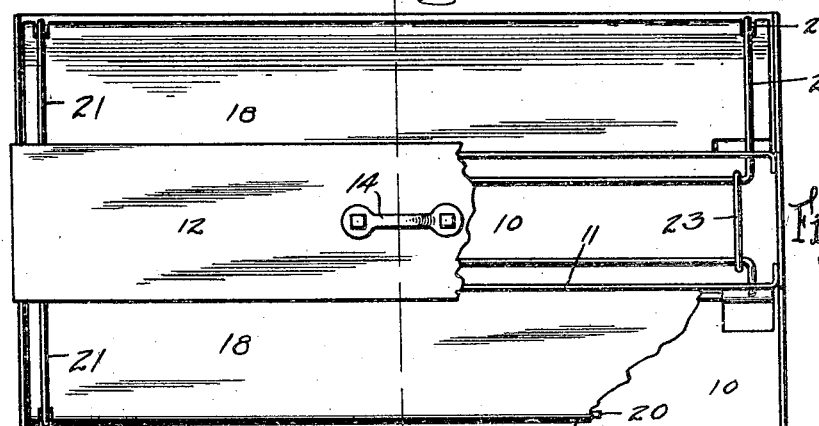
Figure 1 is a top, plan view of my improved feeder, parts being broken away and shown in section to better illustrate the construction.
Figure 2:
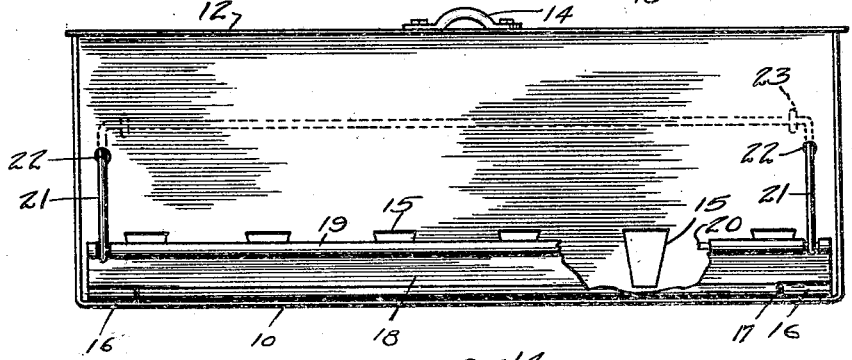
Figure 2 is a side elevation of my improved feeder, with parts broken away.

In the accompanying drawings, I have used the reference numeral to indicate generally a base having a hopper 11 mounted thereon.

The base 10 may be formed of sheet metal and has its ends turned up so as to provide the end walls for the hopper 11.

A cover member 12 rests upon the upper side of hopper 11 and is provided with a downturned flange 13 for securely holding the cover 12 in position. The cover 12 may be provided with any suitable handle 14.

The side walls of the hopper 11 are each provided with a number of tapered openings 15 wherein the chickens or the like gain access to the feed within the hopper.

The base 10, which is formed of sheet metal is provided with upturned and rolled portions 16 which serve as one part of the hinge connection 17 for foot rests 18. The foot rests 18 are positioned on each side of the side walls of the hopper 11, as clearly shown in Figure 3 of the drawings.

The hinged connections 17 having foot rests 18 will permit some movement thereof.

The outer free edges of the foot rests 18 are rolled, as at 19, around a bead or wire reinforcing 20.

Connected to the wire bead 20 on each of the foot rests 18 is a yoke member 21. The yoke member 21 has two of its legs projected through enlarged openings 22 formed in the side walls of the hopper 11.

Figure 3:
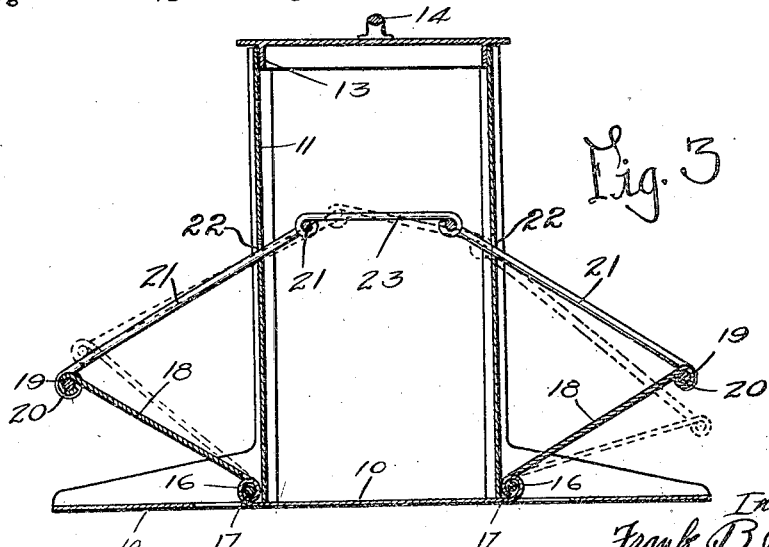
Figure 3 is a sectional view taken on line 3—3 of Figure 1.

The connecting members of the yokes 21 are positioned within the hopper proper and are connected together near each of their ends, by links 23, as clearly shown in Figures 1 and 3 of the drawings.

The connecting members of the yokes 21 serve as stops for permitting the movement of the yoke member relative to the hopper wall.

From the construction of the parts just described, it will be seen that due to the hinge connection of the foot rests 18, I am able to secure some limiting movement of the foot rests 18 in either direction, as clearly shown by dotted lines in Figure 3 of the drawings.

As the chickens or the like feed, they will place their feet on the foot rest in order to stabilize themselves while bending over to reach the hopper. Their weight will cause the yoke members 21 to move for agitating the feed within the hopper 11.

At one time there will probably be more weight on one of the foot rests than at another, and for that reason, the yoke members and links 23, will be see-sawed back and forth.

The foot rests 18 are inclined upwardly and outwardly so that any feed which may pass out through the openings 15, will be collected at their lower end of the foot rests 18 and will, therefore, not be wasted, but may be consumed by the chickens.

The foot rests 18 function for agitating the feed within the hopper and at the same time serve to collect any feed which might possibly pass out through the openings 15 and which might otherwise be wasted. In this connection, it may be said that while a chicken is eating from the hopper she will drop much of the feed on the rest member 18. When the member on one side is pulled downwardly, the one on the other will be tilted upwardly causing the feed to slide toward the hopper.

My feeder is very simple and yet very efficient.

Some changes may be made in the construction and arrangement of the various parts of my invention, without departing from the real spirit and purpose of my invention and it is my intention to cover by my claims, any modified forms of structure or use of mechanical equivalents, which may be reasonably included within their scope.

I claim as my invention:

1. A poultry feeder of the class described comprising a base, a hopper on said base having a plurality of apertures in its sides, foot rests hingedly secured adjacent the lower edge of the sides of the hopper, said foot rests being inclined upwardly and outwardly from said hopper means for connecting the foot rests together, said last means extending through the hopper for agitating the feed therein.

2. A poultry feeder of the class described comprising a base, a hopper on said base having a plurality of apertures in its sides, foot rests on the hopper adjacent said openings and means for connecting the foot rests together, said foot rests being capable of some movement together and being inclined upwardly and outwardly from said hopper so as to form troughs along one side thereof.

3. A poultry feeder of the class described comprising a base, a hopper on said base having a plurality of apertures in its sides, foot rests inclined upwardly and outwardly from said hopper and movably secured adjacent the lower edge of the sides of the hopper, means for connecting the foot rests together, said last means extending through the hopper for agitating the feed therein, stops on said last means for limiting the movement of said foot rests.

Des Moines, Iowa, July 16, 1923.

FRANK B. REILLY.